United States Patent
Cancedda

(10) Patent No.: US 9,213,696 B2
(45) Date of Patent: Dec. 15, 2015

(54) METHODS AND SYSTEMS FOR SECURELY ACCESSING TRANSLATION RESOURCE MANAGER

(75) Inventor: Nicola Cancedda, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 309 days.

(21) Appl. No.: 13/590,372

(22) Filed: Aug. 21, 2012

(65) Prior Publication Data
US 2014/0056428 A1 Feb. 27, 2014

(51) Int. Cl.
*G06F 17/28* (2006.01)
*H04L 9/32* (2006.01)
*H04L 9/06* (2006.01)
*H04L 9/08* (2006.01)

(52) U.S. Cl.
CPC ............ *G06F 17/289* (2013.01); *H04L 9/0643* (2013.01); *H04L 9/0822* (2013.01); *H04L 9/3236* (2013.01)

(58) Field of Classification Search
CPC .................................................. G06F 17/289
See application file for complete search history.

(56) References Cited

U.S. PATENT DOCUMENTS

| 5,995,625 | A | * | 11/1999 | Sudia | G06F 21/6209 705/51 |
| 6,131,082 | A | * | 10/2000 | Hargrave, III | G06F 17/2827 704/7 |
| 7,305,702 | B2 | | 12/2007 | Bell et al. | |
| 7,472,105 | B2 | * | 12/2008 | Staddon | G06F 21/6227 |
| 7,877,410 | B2 | | 1/2011 | Staddon et al. | |
| 8,386,461 | B2 | * | 2/2013 | Bachmann | G06F 21/645 707/711 |
| 2008/0059481 | A1 | * | 3/2008 | Kunimatsu | H04N 7/17309 |
| 2009/0316885 | A1 | * | 12/2009 | Mahmud | G06F 17/2258 380/28 |

OTHER PUBLICATIONS

S.Ananthi, M.Sadish Sendil and S.Karthik, Privacy preserving search over encrypted cloud data, 2011, pp. 480-487.*

* cited by examiner

*Primary Examiner* — Jeffrey Pwu
*Assistant Examiner* — Wasika Nipa

(57) ABSTRACT

The disclosed embodiments relate to systems and methods for securely accessing a phrase table. One or more records in the phrase table are encrypted using a first set of keys. The first set of keys is encrypted using a second key. A decoder module is compiled based on the second key. Thereafter, the one or more encrypted records and/or the decoder module are transmitted to the first computing device at the client side. The first set of encrypted keys is transmitted to a second computing device. The first computing device transmits a request to the second computing device to send an encrypted key. The decoder module decrypts the encrypted key to generate a key. The first computing device uses the key to decrypt one or more encrypted records.

29 Claims, 12 Drawing Sheets

METHODS AND SYSTEMS FOR SECURELY ACCESSING TRANSLATION RESOURCE MANAGER

TECHNICAL FIELD

The presently disclosed embodiments are related to a systems and method to access a server. More specifically, the presently disclosed embodiments are related to systems and method for securely accessing a translation resource manager.

BACKGROUND

Translation Resource Manager (TRM) is a system that enables a user to translate a linguistic phrase from a first language to a second language. A client system receives a sentence to be translated from a user. The client system may include a decoder module that breaks the sentence in one or more phrases that are sent to the TRM. The TRM may include a phrase table containing a plurality of source phrases and corresponding translated phrases in the second language. On receiving the request to translate the phrase, the TRM searches for the phrase in each of the plurality of source phrases. Thereafter, the TRM server determines one or more corresponding translated phrase from the phrase table. The TRM server transmits the one or more translated phrase to the client.

In certain scenarios, the client needs to translate a confidential phrase. For the purpose of such translation, the client may have to transmit the confidential phrase to the TRM. The transmission of the confidential phrase may be undesirable to the client.

SUMMARY

According to embodiments illustrated herein, there is provided a computer implemented method of providing a secure access to a phrase table. The computer implemented method includes encrypting one or more records in the phrase table to generate one or more encrypted records. The phrase table facilitates translation of a first phrase from a first language to a second language. The one or more records comprise at least a phrase in the second language. Further, the computer implemented method includes transmitting the one or more encrypted records to a first computing device.

According to embodiments illustrated herein, there is provided a computer implemented method of securely accessing a phrase table. The computer implemented method includes generating a query to access one or more encrypted records in the phrase table. The phrase table facilitates translation of a first phrase from a first language to a second language. The query includes the first phrase in the first language. The one or more encrypted records comprise at least a phrase in the second language.

According to embodiments illustrated herein, there is provided a Translation Resource manager (TRM). The TRM includes an encryption module configured to encrypt one or more records in a phrase table to generate one or more encrypted records. The phrase table facilitates translation of a first phrase from a first language to a second language. The one or more records comprise at least a phrase in the second language. Further, the TRM includes a communication manager configured to transmit the one or more encrypted records through a transceiver to a first computing device.

According to embodiments illustrated herein, there is provided a computing device for securely accessing a phrase table. The computing device includes a query manager configured to generate a query to access one or more encrypted records in the phrase table. The phrase table facilitates translation of a first phrase from a first language to a second language. The query includes the first phrase in the first language. The one or more encrypted records comprise at least a phrase in the second language.

BRIEF DESCRIPTION OF DRAWINGS

The accompanying drawings illustrate various embodiments of systems, methods, and embodiments of various other aspects of the disclosure. Any person having ordinary skills in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit, the scope in any manner, wherein like designations denote similar elements, and in which.

DETAILED DESCRIPTION

Figure 1:
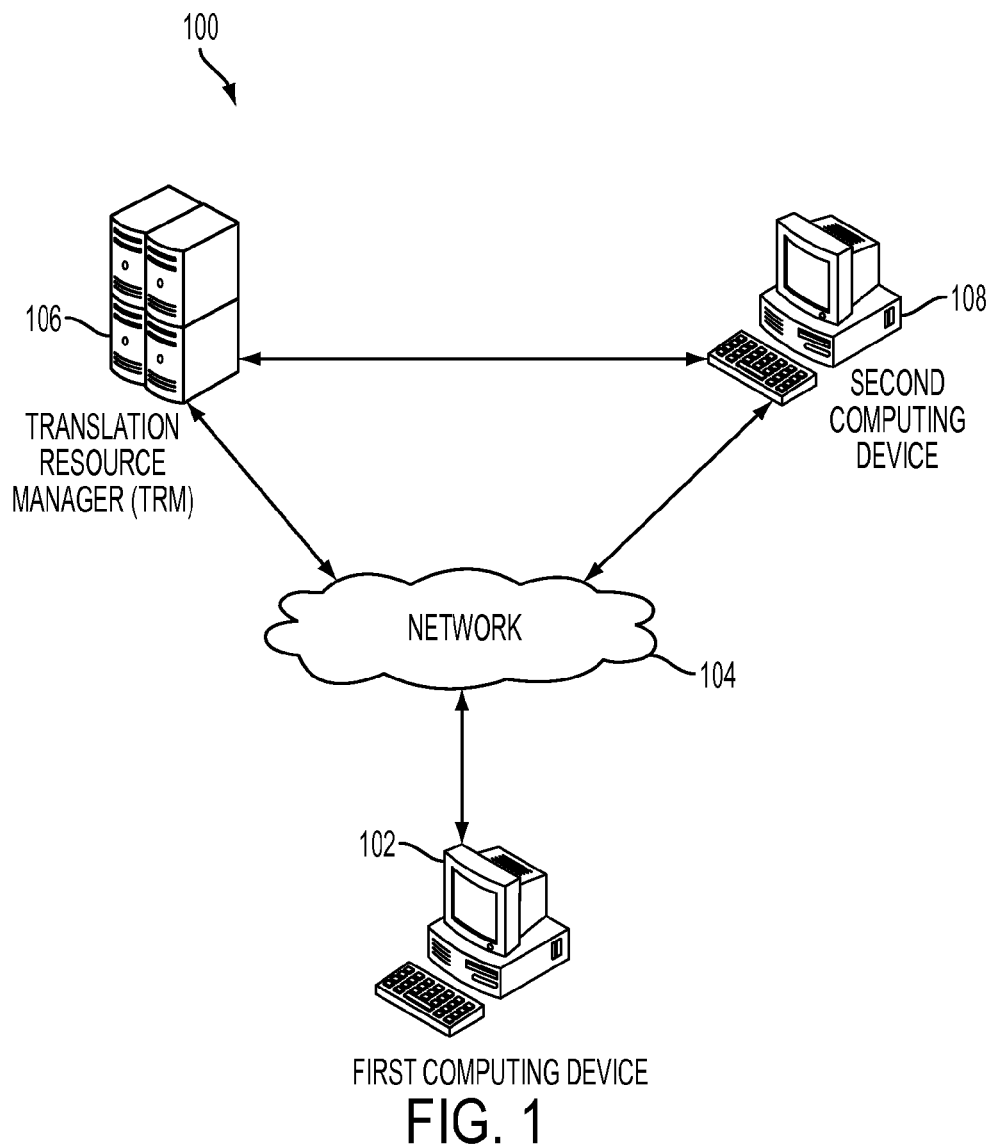
FIG. 1 is a block diagram illustrating a system environment, in which, various embodiments can be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "an embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

DEFINITIONS

The following terms shall have, for the purposes of this application, the respective meanings set forth below.

A "phrase table" refers to a collection of source phrases in a first language and corresponding one or more records that include phrases in a second language. In an embodiment, the phrase table includes one or more scores indicative of the relevance of a record. For example, a phrase table to translate French to English will include one or more source phrases in French. Each of the one or more source phrases will correspond to record in English language. In an embodiment, the phrase table includes multi-lingual translations for the each of the one or more source phrases.

A "record" refers to a linguistic phrase in the second language. Hereinafter, record has been replaceably referred to as translated phrase.

A "source phrase" refers to a linguistic phrase in the first language.

"Encryption" refers to method of transforming a phrase in an unreadable form. In an embodiment, the encryption method utilizes a key to encrypt the phrase. Some examples of the encryption method include Digital rights managements (DRM) techniques, WPA, WEP, Data Encryption Standard algorithm (DES), etc.

A "digest" refers to cryptographic hash value for a phrase that is generated by a cryptographic hash function. Some examples of cryptographic hash function include SHA-1, MD5, SHA-0, etc. In the ongoing description the term "digest" is used for illustrative purpose. Various other terms such as "fingerprints", "checksums", and "hash value" can also be used in place of the term "digest".

A "Key" refers to a piece of information that determines the functional output of an encryption method.

A "decryption key" refers to a piece of information that is utilized by a decryption algorithm to decrypt an encrypted data.

A "query" refers to a request to extract information from a database or a storage medium. In an embodiment, the query is used to extract a record from a phrase table. The query includes a phrase in a first language.

FIG. 1 is a block diagram illustrating a system environment 100, in which, various embodiments can be implemented. The system environment 100 includes a first computing device 102, a network 104, a TRM 106, and a second computing device 108.

The first computing device 102 generates one or more queries that include one or more phrases in a first language. In an embodiment, a user of the first computing device 102 inputs the query that includes a phrase for translation. In an embodiment, the one or more phrases in the first language are to be translated to a second language. Some of the examples of the first computing device 102 include a personal computer, a laptop, a PDA, a mobile device, a tablet, or any device that has the capability to generate one or more queries. The first computing device 102 is described later in conjunction with FIG. 9.

The network 104 corresponds to a medium through which the content and the messages flow between various components (e.g. the first computing device 102, the TRM 106, and the second computing device 108) of the system environment 100. Examples of the network 104 may include, but are not limited to, a Wireless Fidelity (WiFi) network, a Wireless Area Network (WAN), a Local Area Network (LAN) or a Metropolitan Area Network (MAN). Various devices in the system environment 100 can connect to the network 104 in accordance with various wired and wireless communication protocols such as Transmission Control Protocol and Internet Protocol (TCP/IP), User Datagram Protocol (UDP), 2G, 3G or 4G communication protocols.

The TRM 106 includes one or more phrase tables. In an embodiment, the TRM 106 encrypts one or more records in at least one phrase table based on first set keys to generate one or more encrypted records. Thereafter, the TRM 106 transmits the one or more encrypted records to the first computing device 102. The structure of the TRM 106 is described later in conjunction with FIG. 5.

The second computing device 108 receives a first set of keys from the TRM 106. In an embodiment, the second computing device 108 maintains a log about the usage of the first set of keys. In an embodiment, the usage of the first set of keys includes, but is not limited to, the number of keys from the first set of keys used by the first computing device 102, the number of times a key has been used by the first computing device 102, etc. Some of the examples of the second computing device 108 include a personal computer, a laptop, a PDA, a mobile device, a tablet, or any device that has the capability to maintain a log about the first set of keys.

Figure 2:
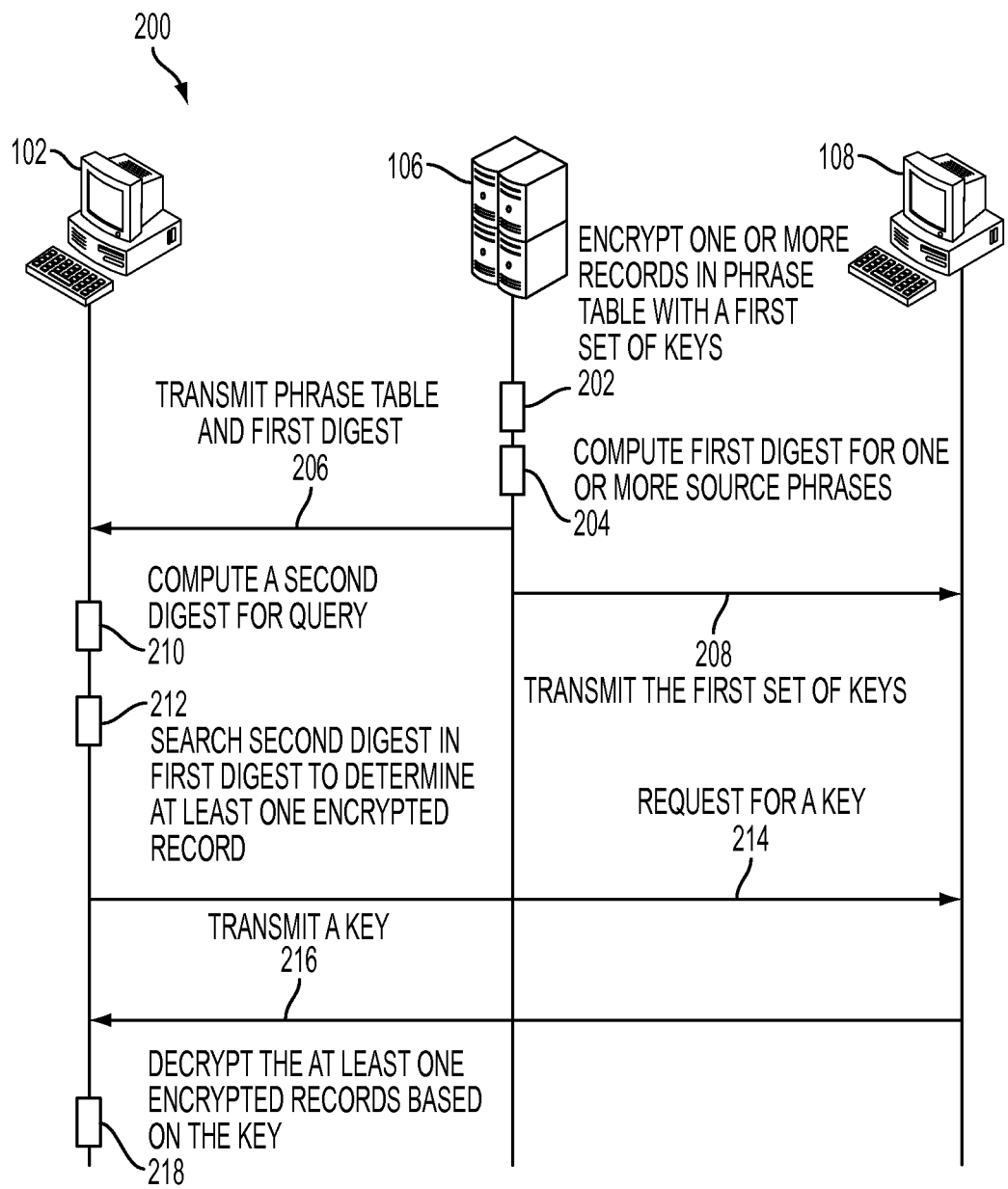
FIG. 2 is a message flow diagram illustrating flow of messages between the various components of the system environment in accordance with at least one embodiment.
Figure 3:
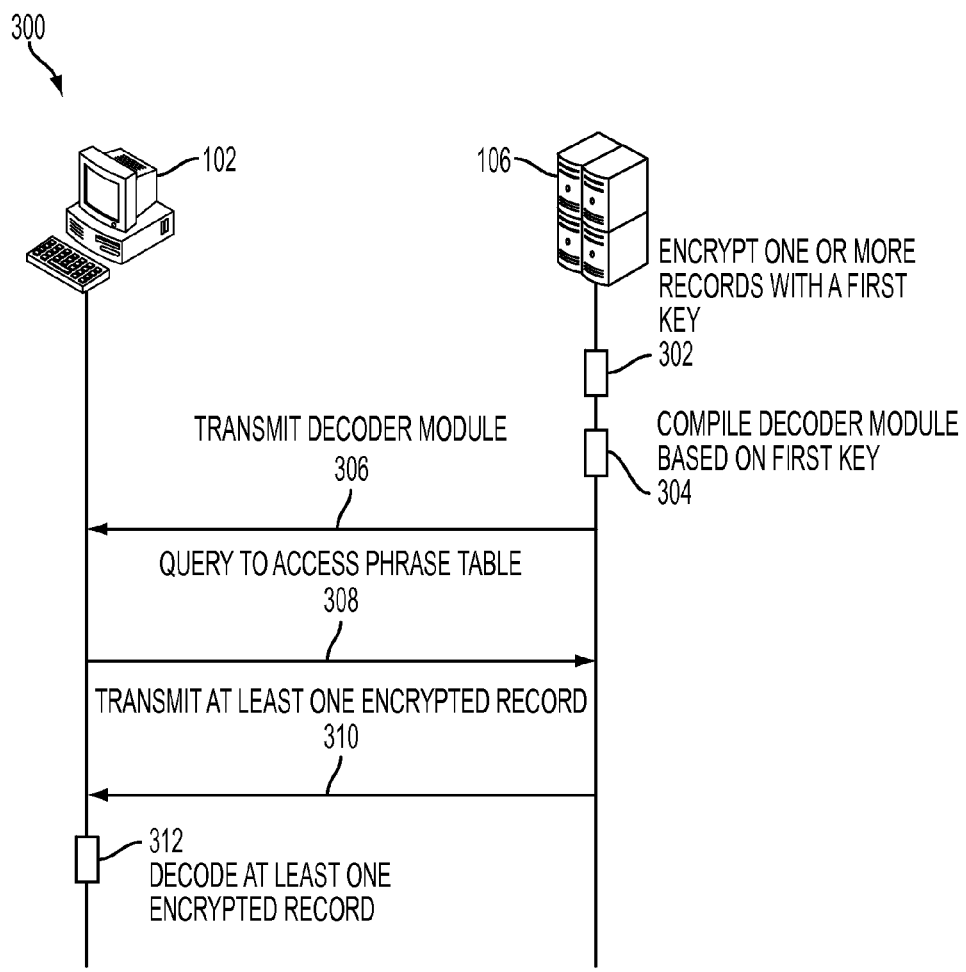
FIG. 3 is another message flow diagram illustrating flow of messages between the various components of the system environment in accordance with at least one embodiment.
Figure 4:
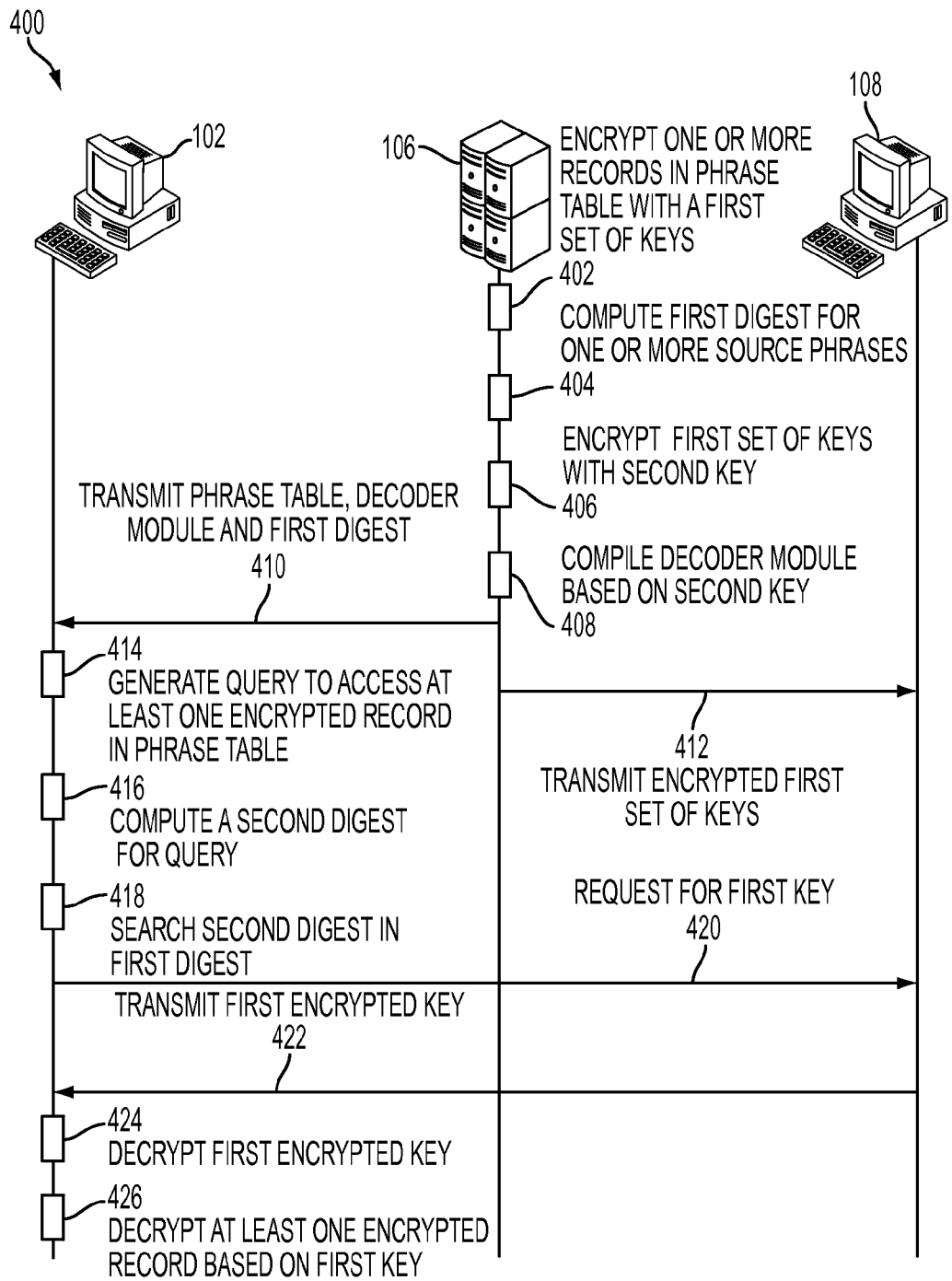
FIG. 4 is yet another message flow diagram illustrating flow of messages between the various components of the system environment in accordance with at least one embodiment.

The operation and interaction between the various components of the system environment 100 has been described in conjunction with FIG. 2, FIG. 3, and FIG. 4.

FIG. 2 is a message flow diagram 200 illustrating the flow of messages/data between the various components of the system environment 100 in accordance with at least one embodiment. The message flow diagram 200 is described in conjunction with FIG. 1.

The TRM 106 (refer FIG. 1) includes a phrase table containing one or more source phrases and corresponding one or more records. The TRM 106 encrypts the one or more records using a first set of keys (depicted by 202) to generate one or more encrypted records. In an embodiment, the TRM 106 encrypts all the records in the phrase table using the first set of keys. In an embodiment, each record is encrypted using a key in the first set of keys. Further, the TRM 106 computes a first digest for each of the one or more source phrases using a cryptographic hash function (depicted by 204). For example, one of source phrases is "red fox". In an embodiment, the TRM 106 computes a digest "43521aecac4af1159de3d45134d0c857" for the source phrase "red fox" using an MD5 hash function. Additionally, the TRM 106 indexes the one or more encrypted records in the phrase table based on the first digest for each of the one or more source phrases. In an embodiment, the TRM 106 sorts the one or more encrypted records in the phrase table based on the value of the first digests.

Thereafter, the TRM 106 transmits the phrase table, including the one or more encrypted records and the first digest for each of the one or more source phrases to the first computing device 102 (depicted by 206). Further, the TRM 106 transmits the first set of keys to the second computing device 108 (depicted by 208).

The first computing device 102 generates at least one query that includes a phrase in a first language. In an embodiment, the phrase has to be translated to a second language. The first computing device 102 computes a second digest for the query. In an embodiment, the first computing device 102 uses the same cryptographic hash function as utilized by the TRM 106 to generate the second digest (depicted by 210).

Thereafter, the first computing device 102 searches for the second digest in the first digest for each of the one or more source phrases (depicted by 212) to determine whether the phrase in the query is present in the one or more source phrases. In an embodiment, the first computing device utilizes one or more searching techniques such as, but not limited to, binary search, and hash table indexing to search for the second digest. If the second digest matches with at least one of the first digests, the phrase in the query is present in the one or more source phrases. Thereafter, the first computing device 102 extracts an encrypted record corresponding to the first digest that is equal to the second digest.

The first computing device 102 requests for a key from the second computing device 108 (depicted by 214). In an embodiment, the first computing device 102 sends a record number, associated with the at least one encrypted record, to the second computing device 108. Based on the record number, the second computing device 108 determines the key from the first set of keys. Thereafter, the second computing device 108 transmits the key to the first computing device 102 (depicted by 216). Concurrently, the second computing device 108 updates and transmits a log to the TRM 106.

The first computing device 102 decrypts the at least one encrypted record using the key received from the second computing device 108 (depicted by 218).

FIG. 3 is another message flow diagram 300 illustrating the flow of messages/data between the various components of the system environment 100 in accordance with at least one embodiment. The message flow diagram 300 is described in conjunction with FIG. 1.

The TRM 106 (refer FIG. 1) encrypts one or more records in a phrase table using a first key (depicted by 302) to generate one or more encrypted records. Thereafter, the TRM 106 compiles a decoder module that includes a decryption key (depicted by 304). The TRM 106 transmits the decoder module to the first computing device 102. The first computing device 102 installs the decoder module (depicted by 306).

The first computing device 102 generates a query that includes a phrase to be translated to a second language. In an embodiment, a user of the first computing device 102 inputs the query through the first computing device 102. In an alternate embodiment, the user of the first computing device 102 inputs the phrase through the first computing device 102. In an embodiment, the first computing device 102 utilizes the decoder module to generate the query. The first computing device 102 transmits the query to the TRM 106 (depicted by 308).

On receiving the query, the TRM 106 extracts at least one encrypted record from the one or more encrypted records in the phrase table. The TRM 106 transmits the at least one encrypted record to the first computing device 102 (depicted by 310).

The decoder module in the first computing device 102 decrypts the at least one encrypted record using the decryption key (depicted by 312).

FIG. 4 is yet another message flow diagram 400 illustrating the flow of messages/data between the various components of the system environment 100 in accordance with at least one embodiment. The message flow diagram 400 is described in conjunction with FIG. 1.

The TRM 106 (refer FIG. 1) encrypts one or more records in the phrase table using a first set of keys to generate one or more encrypted records (depicted by 402). In an embodiment, the TRM 106 encrypts all the records of the phrase table using the first set of keys. Further, the TRM 106 computes a first digest for each of the one or more source phrases in the phrase table using a cryptographic hash function (depicted by 404). Additionally, the TRM 106 indexes the one or more records in the phrase table based on the first digest for each of the one or more source phrases.

The TRM 106 further encrypts the first set of keys with a second key to generate first set of encrypted keys (depicted by 406). Based on the second key, the TRM 106 compiles a decoder module that includes the decryption key for the second key (depicted by 408).

Thereafter, the TRM 106 transmits the phrase table (including the one or more encrypted records), the decoder module, and the first digest for each of the one or more source phrases to the first computing device 102 (depicted by 410). Further, the TRM 106 transmits the first set of encrypted keys to the second computing device 108 (depicted by 412).

The first computing device 102 generates a query that includes a phrase to be translated in the second language (depicted by 414). The first computing device 102 computes a second digest for the query using the same cryptographic hash function that was used by the TRM 106 to generate the first digest (depicted by 416). Thereafter, the first computing device 102 searches for the second digest in the first digest for each of the one or more source phrases to determine whether the phrase is present in the one or more source phrases (depicted by 418). If the phrase is present in the one or more source phrases, the first computing device 102 extracts a corresponding the at least one encrypted record from the phrase table.

The first computing device 102 sends a request to the second computing device 108 for a key to decrypt the at least one encrypted record (depicted by 420). In an embodiment, the first computing device 102 transmits a record number associated with the at least one encrypted record in the phrase table. Based on the record number, the second computing device 108 determines an encrypted key from the first set of encrypted keys. The second computing device 108 transmits the encrypted key to the first computing device 102 (depicted by 422).

The first computing device 102 decrypts the encrypted key using the decoder module to obtain the key (depicted by 424). Thereafter, the first computing device 102 decrypts the encrypted record to obtain the translated phrase for the phrase in the first language (depicted by 426).

In an embodiment, the first computing device 102 deletes the key and the translated phrase.

In an alternate embodiment, the TRM 106 concatenates a random bit string to each of the one or more source phrases prior to computation of the first digest to generate salted source phrases. Concurrently, the TRM 106 generates a table that includes entries of the random bit string. The TRM 106 transmits the table and the first digest for each of the one or more salted source phrases to the first computing device 102. Additionally, the TRM 106 transmits the first set of encrypted keys and the first digests to the second computing device 108. In an embodiment, the TRM 106 indexes the first set of encrypted keys based on the first digests.

The first computing device 102 generates the query that includes the phrase to be translated. The first computing device 102 utilizes the table, received from the TRM 106, to concatenate the phrase with the random bit string to generate a salted phrase. The first computing device 102 computes the second digest for the salted phrase. Thereafter, the first computing device 102 searches for the second digest in the first digest for each of the one or more salted phrases. If the second digest is found in the first digest, the first computing device 102 extracts corresponding encrypted record. Further, the first computing device 102 transmits the second digest to the second computing device 108.

The second computing device 108 extracts and transmits the first set of encrypted key to the first computing device 102. Thereafter, the first computing device 102 decrypts the encrypted records as described above in message flow diagram 400.

Since, the second computing device 108 receives a second digest that has been derived from a salted phrase; the second computing device 108 won't be able to decode the second digest using techniques such as 'rainbow table'.

A person having ordinary skills would understand that the embodiment described above in conjunction with message flow diagram 400 would also be applicable to the message flow diagram 200, flowchart 1000 (described below), and flowchart 1200 (described below).

Figure 5:
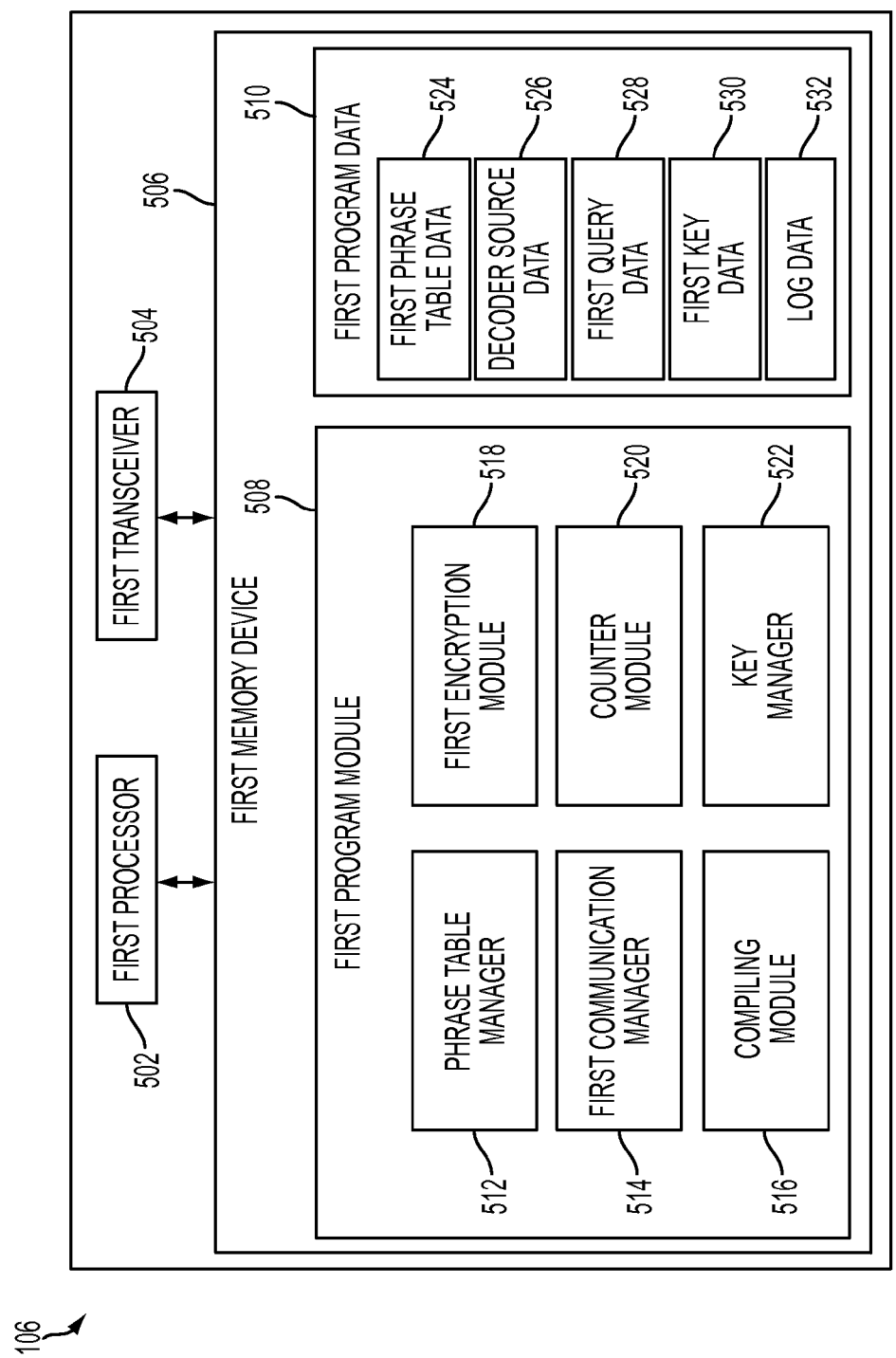
FIG. 5 is a block diagram of a TRM in accordance with at least one embodiment.

FIG. 5 is a block diagram of the TRM 106 in accordance with at least one embodiment. The TRM 106 includes a first processor 502, a first transceiver 504, and a first memory device 506.

The first processor 502 is coupled to the first transceiver 504 and the first memory device 506. The first processor 502 executes a set of instructions stored in the first memory device 506. The first processor 502 can be realized through a number of processor technologies known in the art. Examples of the first processor 502 can be, but are not limited to, X86 processor, RISC processor, ASIC processor, CISC processor, or any other processor.

The first transceiver 504 transmits and receives messages and data to/from the various components (e.g. the first computing device 102, the second computing device 108) of the system environment 100 (refer FIG. 1). Examples of the first transceiver 504 can include, but are not limited to, an antenna, an Ethernet port, a USB port or any port that can be configured to receive and transmit data from external sources. The first transceiver 504 transmits and receives data/messages in accordance with various communication protocols, such as, Transmission Control Protocol and Internet Protocol (TCP/IP), User Datagram Protocol (UDP), 2G, 3G and 4G communication protocols.

The first memory device 506 stores a set of instructions and data. Some of the commonly known memory implementations can be, but are not limited to, random access memory (RAM), read only memory (ROM), hard disk drive (HDD), and secure digital (SD) card. The first memory device 506 includes a first program module 508 and a first program data 510. The first program module 508 includes a set of instructions that can be executed by the first processor 502 to perform one or more operations on the TRM 106. The first program module 508 includes a phrase table manager 512, a first communication manager 514, a compiling module 516, a first encryption module 518, a counter module 520, and a key manager 522. Although, various modules in the first program module 508 have been shown in separate blocks, it may be appreciated that one or more of the modules may be implemented as an integrated module performing the combined functions of the constituent modules.

The first program data 510 includes a first phrase table data 524, a decoder source data 526, a first query data 528, a first key data 530, and a log data 532.

The phrase table manager 512 maintains and updates one or more phrase tables. Further, the phrase table manager 512 stores the one or more phrase tables as the first phrase table data 524. In an embodiment, the phrase table manager 512 extracts one or more records from at least one of the one or more phrase tables based on a query received from the first computing device 102. In an embodiment, the phrase table manager 512 uses one or more querying languages to extract one or more records from the at least one phrase table. Some examples of such querying languages include, but are not limited to, SQL, OQL (Object query language), QUEL, CQL (Context query language), etc.

In an embodiment, the first phrase table data 524 may be stored on a database (not shown) that is external to the TRM 106.

The first communication manager 514 receives one or more queries from the first computing device 102 through the first transceiver 504. In an embodiment, the first communication manager 514 transmits the one or more records of the at least one phrase table to the first computing device 102. The first communication manager 514 includes various protocol stacks such as, but not limited to, Transmission Control Protocol and Internet Protocol (TCP/IP), User Datagram Protocol (UDP), 2G, 3G or 4G communication protocols. The first communication manager 514 transmits and receives the messages/data through the first transceiver 504 in accordance with such protocol stacks.

In an embodiment, the compiling module 516 utilizes the decoder source data 526 to compile a decoder module. In an embodiment, the compiling module 516 embeds a decryption key in the decoder module while compiling the decoder module. In an embodiment, the first communication manager 514 transmits the compiled decoder module to the first computing device 102. The compiling module 516 may utilize various compilers, such as, but not limited to, GCC, G++, or Visual studio compiler to compile the decoder module.

The first encryption module 518 encrypts one or more records in the at least one phrase table using the first set of keys to generate one or more encrypted records. In an alternate embodiment, the first encryption module 518 encrypts each key in the first set of keys using the second key. The first encryption module 518 further generates the first digest for each of the one or more source phrases in the at least one phrase table using one or more cryptographic hash functions. The first encryption module 518 stores the one or more encrypted records and the first digest for each of the one or more source phrases as the first phrase table data 224.

The counter module 520 creates and maintains the log indicative of the usage of keys in the first set of keys. The counter module 520 stores the log as the log data 532.

The key manager 522 manages and maintains various keys being utilized by the first encryption module 518 to encrypt the one or more records in the phrase table. The key manager 522 stores the various keys as the first key data 530.

Figure 6:
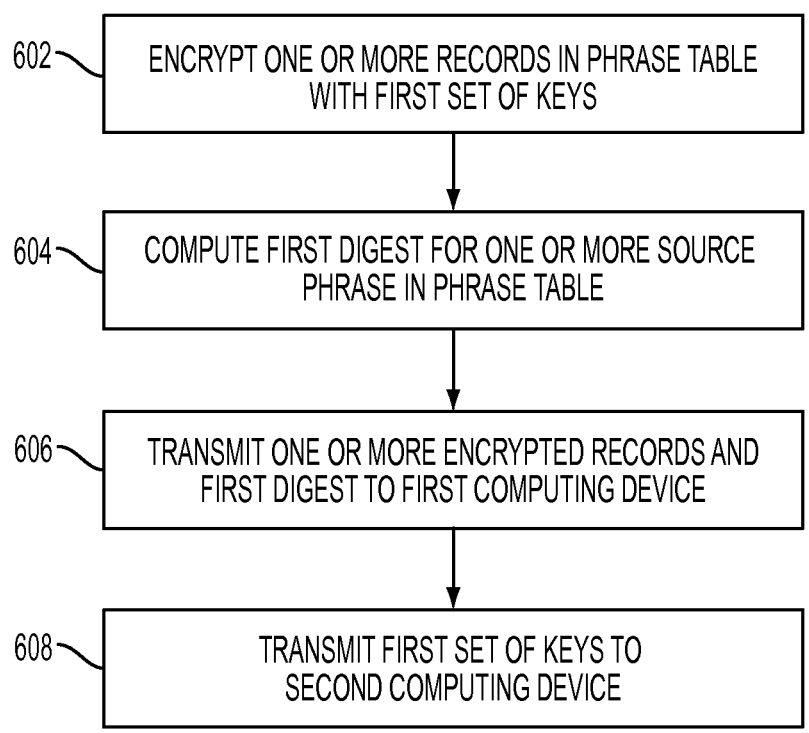
FIG. 6 is a flowchart illustrating a method implemented on a TRM in accordance with at least one embodiment.
Figure 7:
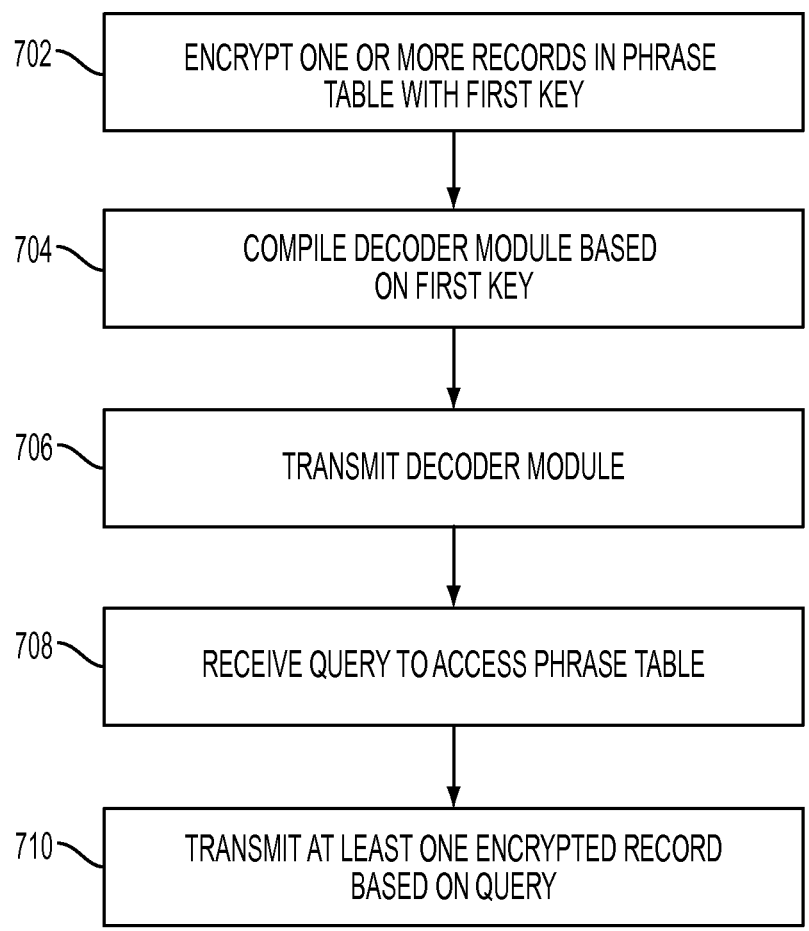
FIG. 7 is another flowchart illustrating a method implemented on a TRM in accordance with at least one embodiment.
Figure 8:
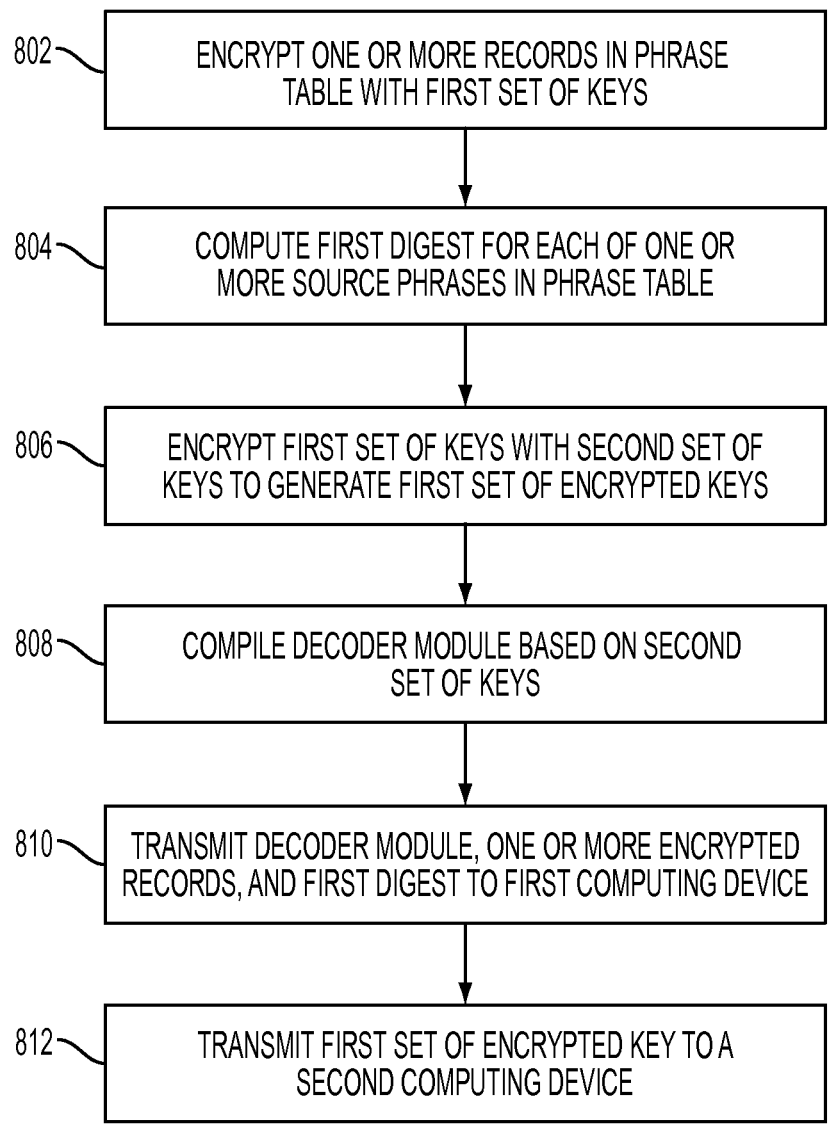
FIG. 8 is yet another flowchart illustrating a method implemented on a TRM in accordance with at least one embodiment.

The operation of the TRM 106 is described in conjunction with FIG. 6, FIG. 7 and FIG. 8.

FIG. 6 is a flowchart 600 illustrating a method implemented on the TRM 106 in accordance with at least one embodiment. The flowchart 600 is described in conjunction with FIG. 1 and FIG. 5.

At step 602, the one or more records in at least one phrase table are encrypted using the first set of keys. In an embodiment, the first encryption module 518 (refer FIG. 5) encrypts the one or more records in the phrase table. Prior to the encryption, the first encryption module 518 extracts the at least one phrase table from the first phrase table data 524. Thereafter, the first encryption module 518 encrypts the one or more records in the at least one phrase table to generate one or more encrypted records. In an embodiment, the first encryption module 518 encrypts all the records in the phrase table with the first set of keys.

At step 604, a first digest is computed for each of the one or more source phrases in the at least one phrase table using a cryptographic hash function. In an embodiment, the first encryption module 518 computes the first digest for each of the one or more source phrases. Post the computation of the first digest, the phrase table manager 512 indexes the one or more encrypted records in the at least one phrase table based on the first digest for each of the one or more source phrases such that digests for each of the one or more source phrases correspond to the respective encrypted records.

At step 606, the one or more encrypted records and the first digest for each of the one or more source phrases are transmitted to the first computing device 102 (refer FIG. 1). In an embodiment, the first communication manager 514 transmits the one or more encrypted records and the first digest to the first computing device 102.

At step 608, the first set of keys is transmitted to the second computing device 108. In an embodiment, the first communication manager 514 transmits the first set of keys to the second computing device 108.

FIG. 7 is another flowchart 700 illustrating a method implemented on a TRM 106 in accordance with at least one embodiment. The flowchart 700 is described in conjunction with FIG. 1 and FIG. 5.

At step 702, the one or more records in at least one phrase table are encrypted using a second key to generate one or more encrypted records. In an embodiment, the first encryption module 518 (refer FIG. 5) encrypts the one or more records in the phrase table using the second key.

At step 704, a decoder module is compiled based on the second key. In an embodiment, the compiling module 516 compiles the decoder module based on the second key. Prior to the compiling of the decoder module, the key manager 522 generates a decryption key for the second key. Further, the key manager 522 stores the decryption key as the first key data 530. The compiling module 516 utilizes the decryption key to compile the decoder module. In an embodiment, the compiling module 516 embeds the decryption key in the decoder source data 526 so that while compiling the decoder source data 526, the decryption key gets embedded in the decoder module.

At step 706, the decoder module is transmitted to the first computing device 102. In an embodiment, the first communication manager 514 transmits the decoder module to the first computing device 102 (refer FIG. 1).

At step 708, a query to access the phrase table is received from the first computing device 102. In an embodiment, the first communication manager 514 receives the query from the first computing device 102 through the first transceiver 504. The first communication manager 514 stores the query as the first query data 528. The phrase table manager 512 utilizes the query from the first query data 528 to extract at least one encrypted record from the phrase table.

At step 710, the at least one encrypted record is transmitted to the first computing device 102. In an embodiment, the first communication manager 514 transmits the at least one encrypted record to the first computing device 102.

FIG. 8 is yet another flowchart 800 illustrating a method implemented on a TRM 106 in accordance with at least one embodiment. The flowchart 800 is described in conjunction with FIG. 1 and FIG. 5.

At step 802, one or more records in at least one phrase table are encrypted with the first set of keys to generate the one or more encrypted records. In an embodiment, the first encryption module 518 (refer FIG. 5) encrypts the one or more records. In an embodiment, the first encryption module 518 encrypts all the records in the phrase table with the first set of keys.

At step 804, a first digest is computed for each of one or more source phrases in the at least one phrase table using a cryptographic hash function. In an embodiment, the first encryption module 518 computes the first digest for each of the one or more source phrases.

At step 806, the first set of keys is encrypted with a second key to generate a first set of encrypted keys. In an embodiment, the first encryption module 518 (refer FIG. 5) encrypts the first set of encrypted keys with the second key.

At step 808, a decoder module is compiled based on the second key. In an embodiment, the compiling module 516 compiles the decoder module based on the second key. In an embodiment, the decoder module includes a decryption key for the second key. The process of compiling the decoder module has been previously described at step 704 in the flowchart 700.

At step 810, the decoder module, the phrase table (including the one or more encrypted records), and the first digest for each of the one or more source phrases are transmitted to the first computing device 102 (refer FIG. 1). In an embodiment, the first communication manager 514 transmits the decoder module, the phrase table, and the first digest to the first computing device 102 through the first transceiver 504.

At step 812, the first set of encrypted keys is transmitted to the second computing device 108. In an embodiment, the first communication manager 514 transmits the first set of encrypted keys to the second computing device 108.

Figure 9:
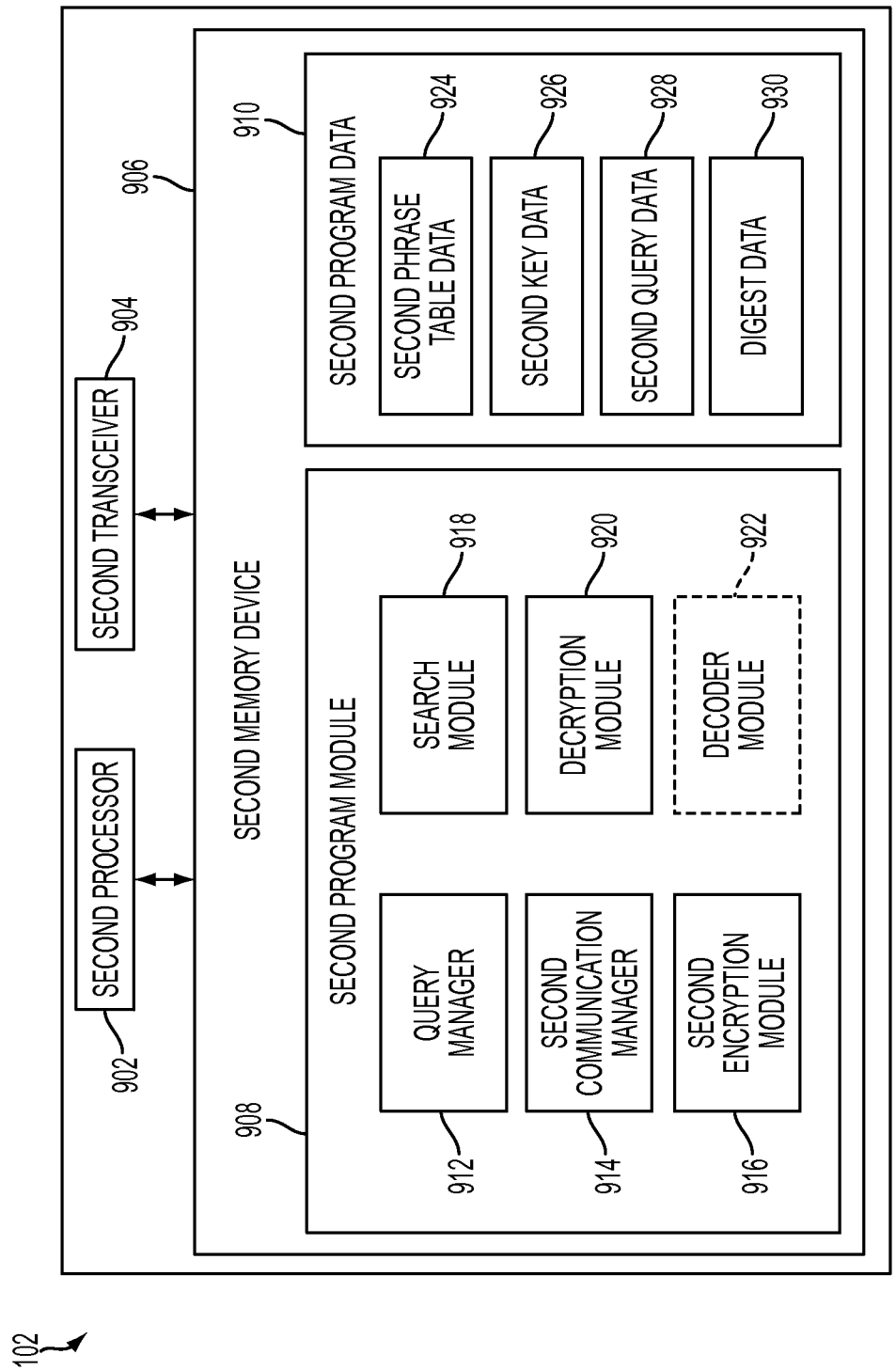
FIG. 9 is a block diagram of a computing device at client side in accordance with at least one embodiment.

FIG. 9 is a block diagram of the first computing device 102 at client side in accordance with at least one embodiment. The first computing device 102 includes a second processor 902, a second transceiver 904, and a second memory device 906. The first computing device 102 is described in conjunction with FIG. 1.

The second processor 902 executes a set of instructions stored in the second memory device 906. The second processor 902 can be realized through a number of processor technologies known in the art. Examples of the second processor 902 can include, but is not limited to, X86 processor, RISC processor, ASIC processor, CSIC processor, ARM processor, or any other processor.

The second transceiver 904 is similar to the first transceiver 504 in the TRM 106 with respect to function, and structure. Further, all the embodiments applicable to the first transceiver 504 are also applicable to the second transceiver 904.

The second memory device 906 is similar to the first memory device 506 in the TRM 106 with respect to function, and structure. Further, the embodiments applicable to the first memory device 506 are also applicable to the second memory device 906. The second memory device 906 includes a second program module 908 and a second program data 910. The second program module 908 includes a query manager 912, a second communication manager 914, a second encryption module 916, a search module 918, a decryption module 920, and a decoder module 922.

The second program data 910 includes a second phrase table data 924, a second key data 926, a second query data 928, and a digest data 930.

The query manager 912 generates a query that includes a phrase in a first language that is to be translated to a second language. In an embodiment, the query manager 912 extracts at least one encrypted record from a phrase table in the second phrase table data 924 based on the query. The query manager 912 stores the query as the second query data 928. In an embodiment, the query manager 912 generates the one or more queries in accordance with one or more querying languages such as SQL, OQL, and QUEL.

In an embodiment, the second communication manager 914 receives the phrase table (includes one or more encrypted records), and/or a first digest for each of the one or more source records from the TRM 106. The second communication manager 914 stores the phrase table and the first digest as the second phrase table data 924. Further, the second communication manager 914 receives a first set of keys from the second computing device 108. The second communication manager 914 stores the first set of keys as the second key data 926.

In an alternate embodiment, the second communication manager 914 receives the decoder module 922 from the TRM 106. In yet another embodiment, the second communication manager 914 transmits the query to the TRM 106. Further, the second communication manager 914 receives at least one encrypted record from the TRM 106 in response to the query.

The second communication manager 914 includes various protocol stacks such as, but not limited to, Transmission Control Protocol and Internet Protocol (TCP/IP), User Datagram Protocol (UDP), 2G, 3G or 4G communication protocols. The second communication manager 914 transmits and receives the messages/data through the second transceiver 904 in accordance with such protocol stacks.

In an embodiment, the second encryption module 916 generates a second digest for the query using one or more cryptographic hash functions. In an embodiment, the second encryption module 916 utilizes the same cryptographic hash function that was utilized by the TRM 106 to generate the first digest. The second encryption module 916 stores the second digest as the digest data 930.

In an embodiment, the search module 918 searches for the second digest in the first digest for each of the one or more source phrases to determine whether the phrase in the query is present in the one or more source phrases in the phrase table. In an embodiment, the search module 918 utilizes one or more searching techniques such as binary search and hash table indexing to search for the second digest.

In an embodiment, the decryption module 920 utilizes the first set of keys, in the second key data 926, to decrypt the at least one encrypted record extracted from the phrase table in the second phrase table data 924.

The decoder module 922 utilizes a decryption key to decrypt the at least one encrypted record received from the TRM 106. In an embodiment, the decoder module 922 includes a decryption key.

Figure 10:
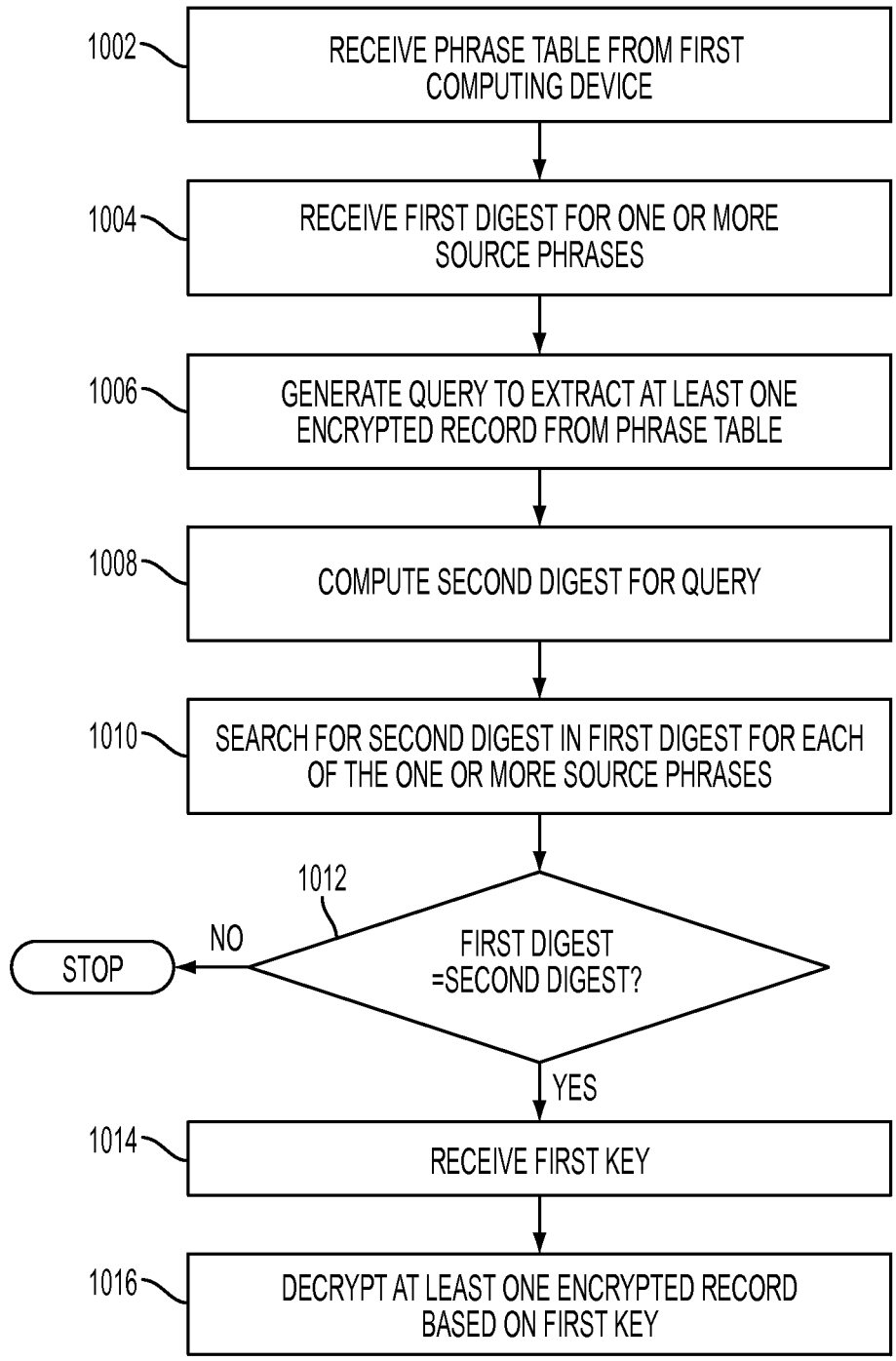
FIG. 10 is a flowchart illustrating a method implemented on a computing device at client end in accordance with at least one embodiment.
Figure 11:
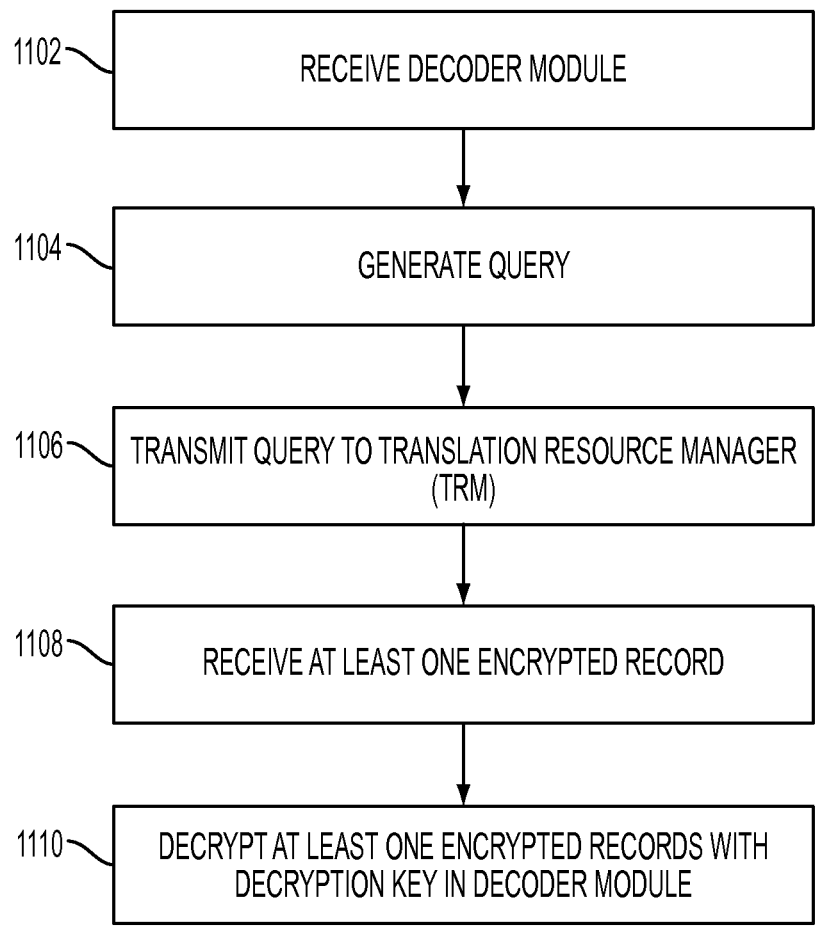
FIG. 11 is another flowchart illustrating a method implemented on a computing device at client end in accordance with at least one embodiment.
Figure 12:
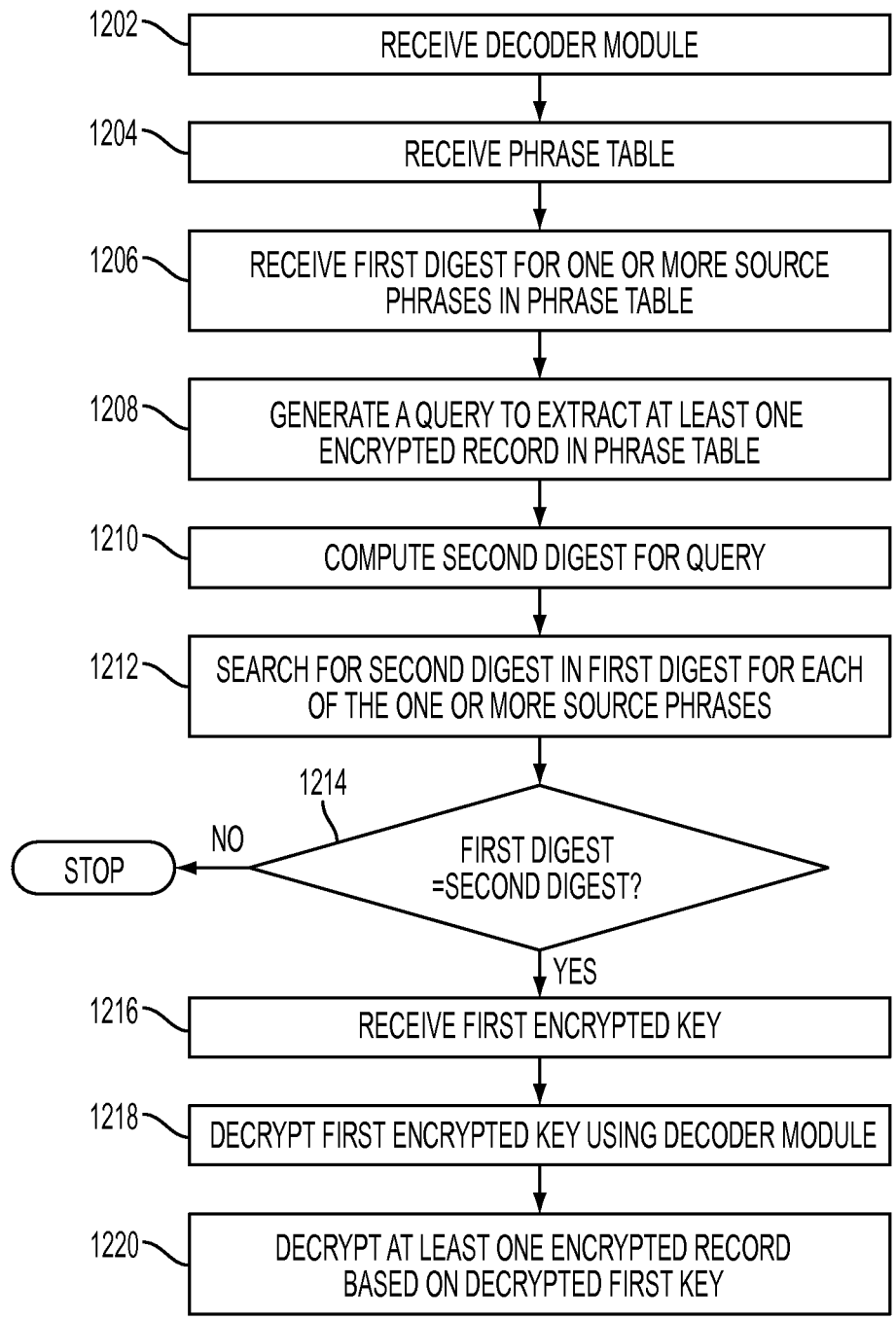
FIG. 12 is yet another flowchart illustrating a method implemented on a computing device at client end in accordance with at least one embodiment.

The operation of the first computing device 102 is described in conjunction with FIG. 10, FIG. 11, and FIG. 12.

FIG. 10 is a flowchart 1000 illustrating a method implemented on the first computing device 102 at client end in accordance with at least one embodiment.

At step 1002, a phrase table (including one or more encrypted records) is received from the TRM 106 (refer FIG. 1). In an embodiment, the second communication manager 914 (refer FIG. 9) receives the phrase table from the TRM 106. The second communication manager 914 stores the phrase table as the phrase table data 924.

At step 1004, a first digest for each of the one or more source phrases is received from the TRM 106. In an embodiment, the second communication manager 914 receives the phrase table from the TRM 106. In an embodiment, the one or more encrypted records in the phrase table have been indexed by the TRM 106 based on the first digest.

At step 1006, a query to access one or more encrypted records in the phrase table is generated. In an embodiment, the query manager 912 generates the query. In an embodiment, the query includes a phrase in a first language that is to be translated.

At step 1008, a second digest is computed for the query using one or more cryptographic functions. In an embodiment, the second encryption module 916 computes the second digest. In an embodiment, the second encryption module 916 uses one or more cryptographic functions used by the TRM 106 to generate the first digest.

At step 1010, the second digest is searched in the first digest for each of the one or more source phrases, to determine whether the phrase in the query is present in the one or more source phrases. In an embodiment, the search module 918 searches for the second digest.

At step 1012, a check is performed whether the second digest is found in at least one of the first digests. In an embodiment, the search module 918 performs the check. If at step 1012 it is determined that the second digest is equal to the first digest, then the phrase in query is present in the one or more source phrases and step 1014 is performed.

At step 1014, a first key is received from the second computing device 108. In an embodiment, the second communication manager 914 receives the first key. Prior to receiving the first key, the query manager 912 extracts at least one encrypted record from the phrase table based on the query. In an embodiment, the at least one encrypted record corresponds to a first digest (equal to the second digest) determined at step 1012. Thereafter, the second communication manager 914 transmits a request for the first key to the second computing device 108. In an embodiment, the request includes a record number associated with of the at least one encrypted record.

At step 1016, the at least one encrypted record is decrypted using the first key. In an embodiment, the decryption module 920 decrypts the at least one record.

If at step 1012, it is determined that the second digest is not equal to any of the first digests, the search module 918 draws an inference that the phrase table in the second phrase table data 924 does not include the translation for the phrase in the query.

FIG. 11 is another flowchart 1100 illustrating a method implemented on the first computing device 102 at client end in accordance with at least one embodiment.

At step 1102, the decoder module 922 (refer FIG. 9) is received from the TRM 106. In an embodiment, the second communication manager 914 receives the decoder module 922 from the TRM 106. In an embodiment, the decoder module 922 includes a decryption key.

At step 1104, a query, including a phrase to be translated, is generated. In an embodiment, the query manager 912 generates the query.

At step 1106, the query is transmitted to the TRM 106 (refer FIG. 1). In an embodiment, the second communication manager 914 transmits the query to the TRM 106.

At step 1108, at least one encrypted record is received from the TRM 106 in response to the query. In an embodiment, the second communication manager 914 receives the at least one encrypted record.

At step 1110, the at least one encrypted record is decrypted by the decoder module 922 using the decryption key.

FIG. 12 is yet another flowchart 1200 illustrating a method implemented on the first computing device 102 at client end in accordance with at least one embodiment.

At step 1202, the decoder module 922 is received from the TRM 106. In an embodiment, the second communication manager 914 receives the decoder module 922 from the TRM 106. In an embodiment, the decoder module 922 includes a decryption key.

At step 1204, a phrase table (including one or more encrypted records) is received from the TRM 106. In an embodiment, the second communication manager 914 receives the phrase table from the TRM 106. The second communication manager 914 stores the phrase table as the second phrase table data 924.

At step 1206, a first digest for each of the one or more source phrases is received from the TRM 106. In an embodiment, the second communication manager 914 receives the phrase table from the TRM 106. In an embodiment, the one or more encrypted records in the phrase table have been indexed by the TRM 106 based on the first digest.

At step 1208, a query to access one or more encrypted records in the phrase table is generated. In an embodiment, the query manager 912 generates the query. In an embodiment, the query includes a phrase in a first language that is to be translated.

At step 1210, a second digest is computed for the query using one or more cryptographic function. In an embodiment, the second encryption module 916 computes the second digest. In an embodiment, the second encryption module 916 uses the same one or more cryptographic function as used by the TRM 106 to generate the first digest.

At step 1212, the second digest is searched in the first digest for each of the one or more source phrases, to determine whether the phrase in the query is present in the one or more source phrases. In an embodiment, the search module 918 searches for the second digest.

At step 1214, a check is performed whether the second digest is equal to at least one of the first digest for the one or more source phrase. In an embodiment, the search module 918 performs the check. If at step 1012 it is determined that the second digest is equal to the first digest, then the phrase in query is present in the one or more source phrases and step 1216 is performed.

At step 1216, a first encrypted key is received from the second computing device 108. In an embodiment, the second communication manager 914 receives the first encrypted key. Prior to receiving the first encrypted key, the query manager 912 extracts at least one encrypted record from the phrase table in the second phrase table data 924 based on the query. In an embodiment, the at least one encrypted record corresponds to a first digest (equal to the second digest) determined at step 1214. Thereafter, the second communication manager 914 transmits a request for a first key to the second computing device 108. In an embodiment, the request includes the record number associated with the at least one encrypted record.

At step 1218, the first encrypted key is decrypted using the decryption key in the decoder module 922 to generate a first key.

At step 1220, the at least one encrypted record is decrypted using the first key. In an embodiment, the decryption module 920 decrypts the at least one encrypted record.

If at step 1214, it is determined that the second digest is not equal to any of the first digest, the search module 918 draws an inference that the phrase table in the second phrase table data 924 does include the translation for the phrase in the query.

From the disclosed embodiment, it is observed that the first computing device 102 receives the phrase table (including the one or more encrypted records) from the TRM 106. The first computing device 102 further receives a decoder module 922. Since, the first computing device 102 has the phrase table; there is no need to transmit the query to the TRM 106.

Further, from the disclosed embodiments it is observed that the first computing device 102 receives an encrypted key to decrypt the one or more encrypted records in the phrase table. The decoder module 922 decrypts the encrypted key to generate a key that is utilized by the first computing device 102 to decrypt an encrypted record. Since, the first computing device 102 cannot utilize the encrypted key to decrypt the encrypted record; the first computing device 102 cannot determine all the records in the phrase table.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, etc. The storage device may also be a means for loading computer programs or other instructions into the computer system. The computer system also includes a communication unit. The communication unit allows the computer to connect to other databases and the Internet through an Input/output (I/O) interface, allowing the transfer as well as reception of data from other databases. The communication unit may include a modem, an Ethernet card, or other similar devices, which enable the computer system to connect to databases and networks, such as, LAN, MAN, WAN, and the Internet. The computer system facilitates inputs from a user through input device, accessible to the system through an I/O interface.

The computer system executes a set of instructions that are stored in one or more storage elements, in order to process input data. The storage elements may also hold data or other information, as desired. The storage element may be in the form of an information source or a physical memory element present in the processing machine.

The programmable or computer readable instructions may include various commands that instruct the processing machine to perform specific tasks such as, steps that constitute the method of the disclosure. The method and systems described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, results of previous processing, or a request made by another processing machine. The disclosure can also be implemented in all operating systems and platforms including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the disclosure titled "methods and systems for securely accessing translation resource manager" have been disclosed. However, it should be apparent to those skilled in the art that many more modifications, besides those described, are possible without departing from the inventive concepts herein. The embodiments, therefore, are not to be restricted, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create many other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, etc.

The claims can encompass embodiments for hardware, software, or a combination thereof.

It will be appreciated that variants of the above disclosed, and other features and functions or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A computer implemented method of providing a secure access to a phrase table, the computer implemented method comprising:
    encrypting, by a first processor in a translation resource manager (TRM), one or more records in the phrase table to generate one or more encrypted records by use of at least a first set of keys, wherein each of the one or more records comprises a translation of one or more source phrases from a first language to a second language;
    computing, by the first processor, a first digest for each of the one or more source phrases in the phrase table using a cryptographic function;
    indexing, by the first processor, the one or more encrypted records in the phrase table based on the first digest of the corresponding one or more source phrases in the phrase table, wherein the one or more encrypted records, in the phrase table, are sorted based on a value of the first digest of the corresponding one or more source phrases; and
    transmitting, by a first transceiver in the TRM, the phrase table, including the one or more encrypted records and the first digest for each of the one or more source phrases, to a first computing device over a communication network.

2. The computer implemented method of claim 1 further comprising transmitting, by the first transceiver, the first set of keys to a second computing device over the communication network, wherein the second computing device does not have access to the one or more encrypted records.

3. The computer implemented method of claim 1 further comprising:
    encrypting, by the first processor, the first set of keys with a second key to generate a first set of encrypted keys;
    compiling, by the first processor, a decoder module based on the second key;
    transmitting, by the first transceiver, the decoder module to the first computing device over the communication network; and
    transmitting, by the first transceiver, the first set of encrypted keys to a second computing device over the communication network, wherein the second computing device does not receive the one or more encrypted phrases.

4. The computer implemented method of claim 1, wherein the one or more phrases in the second language are encrypted using a second key.

5. The computer implemented method of claim 4 further comprising:
    compiling, by the first processor, a decoder module based on the second key;
    transmitting, by the first transceiver, the decoder module to the first computing device over the communication network;
    receiving, by the first transceiver, a query from the first computing device, the query including at least a phrase in the first language to be translated in the second language; and
    determining, by the first processor, the one or more encrypted records based on the query.

6. A computer implemented method of securely accessing a phrase table, the computer implemented method comprising:
    generating, by a second processor in a first computing device, a query, comprising at least a phrase in a first language, to access one or more encrypted records in the phrase table, wherein the phrase table facilitates translation of the phrase from the first language to a second language; and
    receiving, by a second transceiver in the first computing device, the phrase table comprising the one or more encrypted records from a translation resource manager (TRM) over a communication network, wherein the one or more encrypted records comprise one or more encrypted phrases in the second language, and wherein the phrase table further comprises a first digest of one or more source phrases, and wherein the one or more encrypted phrases are indexed according to the first digest of the corresponding one or more source phrases.

7. The computer implemented method of claim 6 further comprising:
computing, by the second processor, a second digest for the query based on a cryptographic function;
searching, by the second processor, for the second digest in the first digest for each of the one or more source phrases;
identifying, by the first processor, an encrypted record from the one or more encrypted records based on at least a matching of the second digest with at least one of the first digests;
transmitting, by the second transceiver, a request to a second computing device for a first set of keys over the communication network, wherein the second computing device does not have access to the one or more encrypted records;
receiving, by the second transceiver, the first set of keys from the second computing device over the communication network in response to the request, wherein the TRM encrypts one or more records by use of the first set of keys to generate the one or more encrypted records, and wherein the TRM transmits the first set of keys to the second computing device after encrypting the one or more records; and
decrypting, by the second processor, the encrypted record based on the received first set of keys.

8. The computer implemented method of claim 6, further comprising:
receiving, by the second transceiver, a decoder module from the TRM, wherein the decoder module includes a decryption key;
transmitting, by the second transceiver, the query to the TRM, over the communication network, to access the one or more encrypted records;
receiving, by the second transceiver, at least one encrypted record based on the query; and
decrypting, by the second processor, the at least one encrypted record based on the decryption key in the decoder module.

9. The computer implemented method of claim 6 further comprising:
receiving, by the second transceiver, a decoder module from the TRM over the communication network, wherein the decoder module includes a decryption key for a second key;
computing, by the second processor, a second digest for the query based on a cryptographic function;
searching, by the second processor, for the second digest in the first digest for each of the one or more source phrases;
identifying, by the first processor, an encrypted record from the one or more encrypted records based on at least a matching of the second digest with at least one of the first digests;
transmitting, by the second transceiver, a request to a second computing device for the first set of encrypted keys, wherein the second computing device does not have access to the one or more encrypted records;
receiving, by the second transceiver, a first set of encrypted keys from the second computing device in response to the request, wherein the TRM encrypts one or more records using the first set of keys to generate the one or more encrypted records, wherein the TRM further encrypts the first set of keys using the second key, and wherein the TRM transmits the first set of encrypted keys to the second computing device;
decrypting, by the second processor, the first set of encrypted keys using the decoder based on the decryption key to generate the first set of keys; and
decrypting, by the second processor, the one or more encrypted records based on the first set of keys.

10. The computer implemented method of claim 9, wherein the second processor deletes the first set of keys and the one or more decrypted records.

11. A Translation Resource Manager (TRM) for providing secure access to a phrase table, the TRM comprising:
a first processor configured to encrypt one or more records in the phrase table to generate one or more encrypted records by use of at least a first set of keys, wherein each of the one or more records comprises a translation of one or more source phrases from a first language to a second language
a first transceiver configured to transmit the phrase table with the one or more encrypted records and a first digest for each of the one or more source phrases to a first computing device over the communication network,
wherein the first processor is further configured to compute the first digest for each of the one or more source phrases in the phrase table using a cryptographic function, and
wherein the first processor is further configured to index the one or more encrypted records based on the first digest of the corresponding one or more source phrases in the phrase table, wherein the one or more encrypted records, in the phrase table, are sorted based on a value of the first digest of the corresponding one or more source phrases.

12. The TRM of claim 11, wherein the first transceiver is further configured to transmit the first set of keys to a second computing device over the communication network, wherein the second computing device does not have access to the one or more encrypted records.

13. The TRM of claim 11, wherein the first processor is further configured to encrypt the first set of keys with a second key to generate a first set of encrypted keys.

14. The TRM of claim 13, wherein the first processor is further configured to compile a decoder module based on the second key.

15. The TRM of claim 14, wherein the first transceiver is further configured to:
transmit the first set of encrypted keys to a second computing device over the communication network, wherein the second computing device does not receive the one or more encrypted records; and
transmit the decoder module to the first computing device over the communication network.

16. The TRM of claim 11, wherein the one or more phrases in the second language are encrypted using a second key.

17. The TRM of claim 16, wherein the first processor is further configured to compile a decoder module based on the second key.

18. The TRM of claim 17, wherein the first transceiver is further configured to:
transmit the decoder module to the first computing device; and
receive a query from the first computing device, the query including at least a phrase to be translated.

19. The TRM of claim 18, wherein the first processor is further configured to determine the one or more encrypted records based on the query.

20. A first computing device for securely accessing a phrase table, the first computing device comprising:

a second processor configured to generate a query to access one or more encrypted records in the phrase table, wherein the phrase table facilitates translation of a phrase from a first language to a second language, the query comprising the phrase in the first language; and a second transceiver configured to:
  receive the phrase table comprising the one or more encrypted records from a translation resource manager (TRM) over the communication network, wherein the one or more encrypted records comprise one or more encrypted phrases in the second language, and wherein the phrase table further comprises a first digest of one or more source phrases, and wherein the one or more encrypted phrases are indexed according to the first digest of the corresponding one or more source phrases.

21. The first computing device of claim 20, wherein the second processor is further configured to:
  generate a second digest for the query based on a cryptographic function; and
  search for the second digest in the first digest for each of the one or more source phrases.

22. The first computing device of claim 21, wherein the second transceiver is further configured to receive the first set of keys from the second computing device in response to a request, wherein the TRM encrypts one or more phrases in the second language to generate the one or more encrypted records, and wherein the TRM transmits the first set of keys to the second computing device.

23. The first computing device of claim 22, wherein the second processor is further configured to decrypt the encrypted record based on the received first set of keys.

24. The first computing device of claim 20, wherein the second transceiver is further configured to:
  receive a decoder module that includes a decryption key from the TRM over the communication network;
  transmit the query to the TRM over the communication network; and
  receive at least one encrypted record from the TRM based on the query.

25. The first computing device of claim 24, wherein the second processor is further configured to decrypt the one or more encrypted records based on the decryption key.

26. The first computing device of claim 20, wherein the second transceiver is further configured to:
  receive a decoder module from the TRM over the communication network, wherein the decoder module includes a decryption key for a second key,
  wherein the second processor is further configured to:
    generate a second digest for the query based on a cryptographic function; and
    search for the second digest in the first digest for each of the one or more source phrases,
  and wherein the first processor is further configured to identify an encrypted phrase from the one or more encrypted phrases based on the searching and indexing.

27. The first computing device of claim 26, wherein the second transceiver is further configured to receive a first set of encrypted keys from a second computing device in response to the request over the communication network, wherein the TRM encrypts one or more phrases in the second language in the phrase table using the first set of keys to generate the one or more encrypted records, wherein the TRM further encrypts the first set of keys using the second key, and wherein the TRM transmits the first set of encrypted keys to the second computing device.

28. The first computing device of claim 27, wherein the second processor is further configured to decrypt the first set of encrypted keys using the decoder based on the decryption key to generate a first set of keys.

29. The first computing device of claim 28, wherein the second processor is further configured to decrypt the one or more encrypted records based on the first set of keys.

* * * * *